United States Patent
Yamashita

(10) Patent No.: US 10,208,703 B2
(45) Date of Patent: Feb. 19, 2019

(54) PISTON FOR INTERNAL COMBUSTION ENGINE, INTERNAL COMBUSTION ENGINE INCLUDING THIS PISTON, AND MANUFACTURING METHOD OF THIS PISTON

(71) Applicant: TOYOTA JIDOSHA KABUSHIKI KAISHA, Toyota-shi, Aichi-ken (JP)

(72) Inventor: Hideo Yamashita, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 211 days.

(21) Appl. No.: 15/070,347

(22) Filed: Mar. 15, 2016

(65) Prior Publication Data

US 2016/0273483 A1  Sep. 22, 2016

(30) Foreign Application Priority Data

Mar. 17, 2015 (JP) ................. 2015-053712
Jun. 10, 2015 (JP) ................. 2015-117692

(51) Int. Cl.
*F02F 3/10* (2006.01)
*F02F 3/12* (2006.01)

(52) U.S. Cl.
CPC ............ *F02F 3/10* (2013.01); *F02F 3/12* (2013.01); *F05C 2251/048* (2013.01)

(58) Field of Classification Search
CPC .......... F02F 3/10; F02F 3/12; F05C 2251/048
See application file for complete search history.

(56) References Cited

U.S. PATENT DOCUMENTS

| 5,469,777 A * | 11/1995 | Rao ................... F02F 3/105 123/193.6 |
| 7,066,132 B1 * | 6/2006 | Verbrugge .......... F02B 77/04 123/193.6 |
| 9,186,866 B2 | 11/2015 | Merrill et al. |
| 2007/0218303 A1 | 9/2007 | Ogawa et al. |
| 2009/0260594 A1 | 10/2009 | Hara et al. |
| 2012/0042859 A1 | 2/2012 | Sakai |
| 2013/0327289 A1 | 12/2013 | Hiratsuka et al. |

(Continued)

FOREIGN PATENT DOCUMENTS

| JP | S59-41624 A | 3/1984 |
| JP | S59-039142 Y2 | 10/1984 |

(Continued)

OTHER PUBLICATIONS

Notice of Allowance Issued to U.S. Appl. No. 15/129,512 dated Oct. 11, 2017.

*Primary Examiner* — Kevin A Lathers
(74) *Attorney, Agent, or Firm* — Hunton Andrews Kurth LLP

(57) ABSTRACT

There is provided a piston for an internal combustion engine, the piston including: a heat-shielding film provided to an upper surface of a land part of the piston, the heat-shielding film having a lower thermal conductivity than a piston base material and having a lower heat capacity per unit volume than the piston base material; and a first heat-retaining film provided to a side surface of the land part, the first heat-retaining film having a lower thermal conductivity than the piston base material and having a higher heat capacity per unit volume than the heat-shielding film.

6 Claims, 8 Drawing Sheets

(56) References Cited

U.S. PATENT DOCUMENTS

| | | | |
|---|---|---|---|
| 2014/0202386 A1 | 7/2014 | Taga et al. | |
| 2014/0290617 A1* | 10/2014 | Tomita | F02B 77/11 |
| | | | 123/193.5 |
| 2015/0144093 A1* | 5/2015 | Harada | F02B 17/005 |
| | | | 123/294 |
| 2015/0204268 A1 | 7/2015 | Sasaki | |

FOREIGN PATENT DOCUMENTS

| | | |
|---|---|---|
| JP | S60-30451 A | 2/1985 |
| JP | H02-137662 A | 5/1990 |
| JP | H05-079564 A | 3/1993 |
| JP | H06-081711 A | 3/1994 |
| JP | H10-102296 A | 4/1998 |
| JP | H11-280545 A | 10/1999 |
| JP | 2002-332571 A | 11/2002 |
| JP | 2008-111367 A | 5/2008 |
| JP | 2009-243355 A | 10/2009 |
| JP | 2010-249008 A | 11/2010 |
| JP | 2012-072745 A | 4/2012 |
| JP | 2013-014830 A | 1/2013 |
| JP | 2014-020300 A | 2/2014 |
| JP | 2014-160790 A | 9/2014 |

* cited by examiner

PISTON FOR INTERNAL COMBUSTION ENGINE, INTERNAL COMBUSTION ENGINE INCLUDING THIS PISTON, AND MANUFACTURING METHOD OF THIS PISTON

INCORPORATION BY REFERENCE

The disclosure of Japanese Patent Application No. 2015-053712 and 2015-117692 filed on Mar. 17, 2015 and Jun. 10, 2015 including the specification, drawings and abstract is incorporated herein by reference in its entirety.

BACKGROUND OF THE INVENTION

1. Field of the Invention

The present invention relates to a piston for an internal combustion engine, an internal combustion engine including this piston, and a manufacturing method of this piston.

2. Description of Related Art

A conventional piston for an internal combustion engine is disclosed, for example, in Japanese Patent Application Publication No. 2009-243355, in which a heat-shielding film having a lower thermal conductivity than a piston base material and having a lower heat capacity per unit volume than the piston base material is formed on the upper surface of a land part. A heat-shielding film having such thermal properties allows the temperature of the upper surface of the land part to follow the temperature of a working medium inside a cylinder of an internal combustion engine. That is, during the combustion stroke of the internal combustion engine, the temperature of the upper surface of the land part can be increased, while during the intake stroke, the temperature of the upper surface can be lowered. Thus, it is possible to improve the fuel efficiency by reducing cooling loss during the combustion stroke, and to suppress occurrence of knocking or abnormal combustion due to heating of the working medium during the intake stroke.

Another piston for an internal combustion engine is disclosed in Japanese Patent Application Publication No. 11-280545, in which a ferrous metal material having a lower thermal diffusivity than a piston base material (specifically, an aluminum alloy) is provided to the side surface of a land part. Providing a metal material having such thermal properties can increase the temperature around the metal material. Thus, it is possible to improve the combustion efficiency of the internal combustion engine by promoting the evaporation and gasification of a liquid fuel adhering to or around the surface of the metal material.

SUMMARY OF THE INVENTION

The downside of forming a heat-shielding film having thermal properties as disclosed in JP 2009-243355 A on the upper surface of the land part is that, as the temperature of the upper surface increases during the combustion stroke, the viscosity of the working medium increases, so that the fluidity of the working medium decreases and deterioration of combustion is likely to occur. Once deterioration of combustion occurs, a flame that under normal conditions propagates throughout the inside of the cylinder during the combustion stroke fails to reach the side surface of the land part. Then, the working medium present around the side surface of the land part, unable to combust during the combustion stroke, remains around the side surface. Moreover, as a new working medium flows into the cylinder during the intake stroke after the combustion stroke, the working medium remaining around the side surface of the land part is cooled, so that fuel inside the working medium is condensed and adheres to the side surface.

As for this problem, providing the metal material of JP 11-280545 A to the side surface of the land part of JP 2009-243355 A can allow the temperature around the metal material to increase easily. However, JP 11-280545 A specifies the thermal diffusivity of the metal material but does not mention the heat capacity per unit volume of the metal material. Accordingly, when the metal material of JP 11-280545 A is provided to the side surface of the land part of JP 2009-243355 A, even if the temperature of the surface of the metal material can be increased during the combustion stroke and the exhaust stroke by virtue of the low thermal diffusivity of the metal material, the temperature of the surface may decrease during the following intake stroke. Therefore, if the working medium is carried over to the intake stroke due to deterioration of combustion as described above, the fuel inside the working medium is condensed and adheres to the surface of the metal material during the intake stroke.

Moreover, the metal material of JP 11-280545 A is provided to a portion of the side surface of the land part from the upper surface of the land part to the middle of the second land. In other words, this metal material is provided not only to the side surface of the top land but also to the side surface of the second land. Accordingly, heat transfer from the upper surface of the land part to the inner wall surface of the cylinder via a piston ring fitted in a groove between the top land and the second land (i.e., top ring) is prevented. As a result, heat can migrate from the heat-shielding film to a working medium that newly flows into the cylinder during the intake stroke, and the working medium is heated. Thus, knocking or abnormal combustion occurs despite the heat-shielding film formed on the upper surface of the land part.

The present invention has been contrived to solve at least one of the above-described problems. That is, an object of the present invention is to suppress fuel adhesion to the side surface of the land part and suppress heating of a working medium during an intake stroke in a piston for an internal combustion engine in which a heat-shielding film having a lower thermal conductivity than a piston base material and having a lower heat capacity per unit volume than the piston base material is formed on the upper surface of the land part.

A first aspect of the present invention is a piston for an internal combustion engine, the piston including: a heat-shielding film provided to an upper surface of a land part of the piston, the heat-shielding film having a lower thermal conductivity than a piston base material and having a lower heat capacity per unit volume than the piston base material; and a first heat-retaining film provided to a side surface of the land part, the first heat-retaining film having a lower thermal conductivity than the piston base material and having a higher heat capacity per unit volume than the heat-shielding film.

A second aspect of the present invention is the piston according to the first aspect, wherein the first heat-retaining film is provided to a part of a side surface of a top land; the top land is a portion of the land part further on the upper side than a groove in which a top ring is fitted; and the side surface of the top land located on the side of the upper surface of the land part has a higher heat-retaining effect than the side surface of the top land located on the side of a lower surface of the land part.

A third aspect of the present invention is the piston according to the first aspect or the second aspect, wherein the first heat-retaining film is provided to a side surface of a top land; the top land is a portion of the land part further on the upper side than a groove in which a top ring is fitted; and the piston base material is exposed in a portion of the side surface of the land part further on the lower side than the groove.

A fourth aspect of the present invention is an internal combustion engine including the piston according to any one of the first aspect to the third aspect, wherein a second heat-retaining film is provided to an inner wall surface of a cylinder that houses the piston; the second heat-retaining film is provided at such a position that the second heat-retaining film faces the side surface of the land part when the piston is located at a bottom dead point; and the second heat-retaining film has a heat capacity per unit volume lower than that of the piston base material and higher than that of the heat-shielding film.

A fifth aspect of the present invention is a manufacturing method of a piston for an internal combustion engine, the piston including: a heat-shielding film provided to an upper surface of a land part of the piston, the heat-shielding film having a lower thermal conductivity than a piston base material and having a lower heat capacity per unit volume than the piston base material; and a first heat-retaining film provided to a side surface of the land part, the first heat-retaining film having a lower thermal conductivity than the piston base material and having a higher heat capacity per unit volume than the heat-shielding film, the manufacturing method including: forming the heat-shielding film on the upper surface of the land part by anodizing the piston base material; and after forming the heat-shielding film, forming the first heat-retaining film on the side surface of the land part by forming a film of an insulating material, the insulating material having a lower thermal conductivity than the piston base material and having a higher heat capacity per unit volume than the heat-shielding film.

According to the first aspect, the heat-retaining film having a lower thermal conductivity than the piston base material and having a higher heat capacity per unit volume than the heat-shielding film is formed on the side surface of the land part, so that it is possible to increase the average temperature of the side surface during one cycle of the internal combustion engine and to suppress decrease in temperature of the side surface of the land part during the intake stroke. Accordingly, even if, in a certain cycle, a working medium present around the side surface of the land part remains without combusting during the combustion stroke and is carried over to the intake stroke, the working medium can be combusted during the combustion stroke after the intake stroke. Thus, fuel adhesion to the side surface of the land part can be suppressed.

To look at the side surface of the land part, the temperature of the side surface decreases with the increasing distance from the upper surface of the land part. Accordingly, if the working medium present around the side surface of the land part remains without combusting during the combustion stroke and is carried over to the intake stroke, there is a high probability that fuel inside the residual working medium is condensed in a region closer to the lower surface of the land part. In this regard, according to the second aspect, the heat-retaining effect of the side surface of the top land is higher on the side of the lower surface of the land part than on the side of the upper surface, so that it is possible to favorably suppress the condensation of the fuel inside the residual working medium in a region closer to the lower surface.

According to the third aspect, the piston base material can be exposed further on the lower side than the groove in which the top ring is fitted, so that it is possible to increase the amount of heat transfer from the upper surface of the land part to the inner wall surface of the cylinder via the inside of the land part and the top ring. Thus, heating of the working medium during the intake stroke can be suppressed.

Basically, the temperature of the inner wall surface of the cylinder decreases with the decreasing distance to a crankcase. Accordingly, the temperature of the heat-retaining film formed on the side surface of the land part can be considered to be lowest at the bottom dead point where the distance to the crankcase is minimum. In this regard, according to the fourth aspect, the heat-retaining film having a heat capacity per unit volume lower than that of the piston base material and higher than that of the heat-shielding film is formed on the inner wall surface of the cylinder that faces the side surface of the land part when the piston is located at the bottom dead point, so that, at the position where the temperature of the heat-retaining film formed on the side surface is lowest, the working medium present around the side surface can be warmed by the heat-retaining film formed on the inner wall surface. Thus, fuel adhesion to the side surface of the land part can be suppressed.

If the heat-shielding film is formed by anodizing after a film of an insulating material is formed, the anodization reaction is inhibited and the heat-shielding film to be formed may vary in structure and film thickness. In this regard, according to the fifth aspect, the heat-retaining film can be formed by forming a film of an insulating material after the heat-shielding film is formed by anodizing, so that the heat-shielding film can be favorably formed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

In the following, embodiments of the present invention will be described on the basis of the drawings. The same components among the drawings will be given the same reference signs and repeated description thereof will be omitted. The present invention is not to be limited by the following embodiments.

Figure 1:
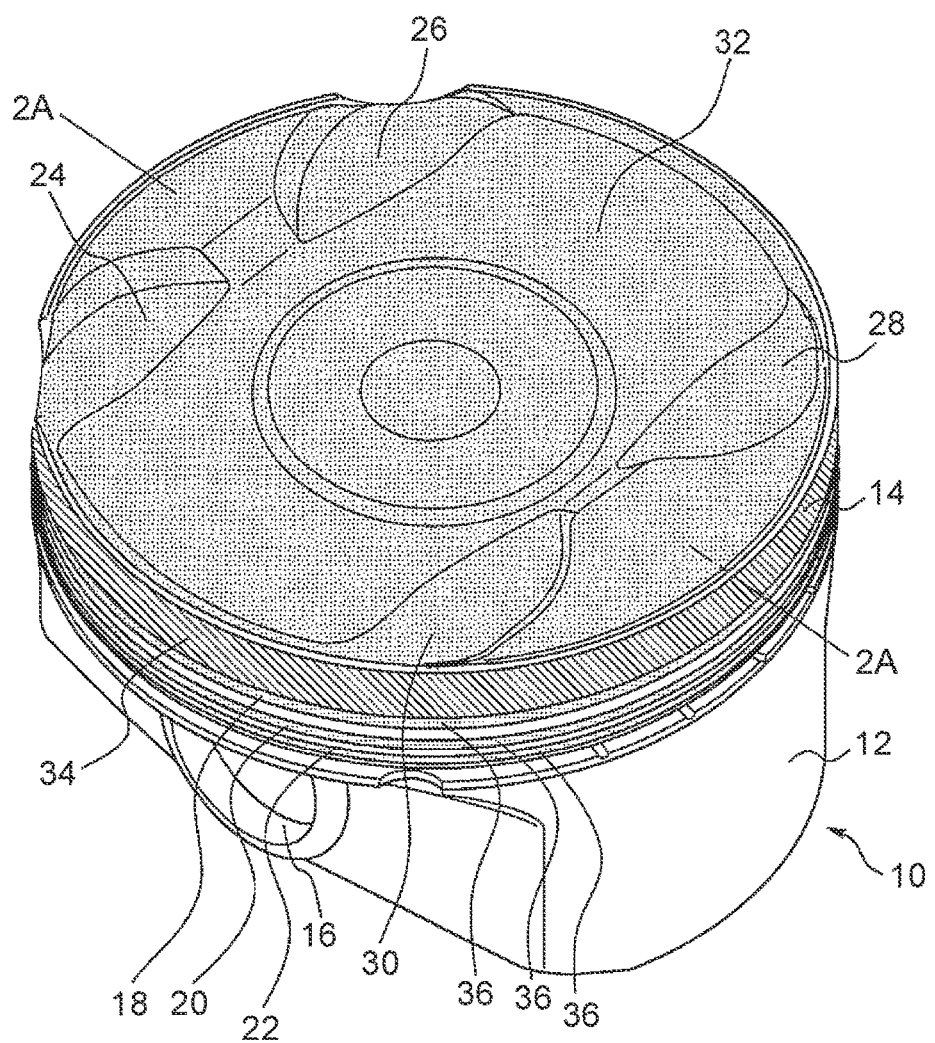
FIG. 1 is a perspective view of a piston according to an embodiment of the present invention.

[Piston for internal combustion engine] First, an embodiment of a piston of the present invention will be described with reference to FIG. 1. FIG. 1 is a perspective view of a piston 10 according to the embodiment of the present invention. Like a common piston for an internal combustion engine, the piston 10 is formed by casting an aluminum alloy that is a piston base material. As shown in FIG. 1, the piston 10 includes a cylindrical skirt part 12 of which the side surface comes into sliding contact with the inner wall surface of a cylinder (not shown), a land part 14 of a predetermined thickness formed at the upper end of the skirt part 12, and a pin boss part 16 supporting a piston pin (not shown). Grooves 18, 20, 22, in which three piston rings (not shown) are respectively fitted, are formed in the side surface of the land part 14. On the upper surface of the land part 14 (hereinafter may also be referred to as a "piston top surface"), crescent-shaped valve recesses 24, 26, 28, 30 for avoiding interference with an intake valve and an exhaust valve (neither is shown) are formed.

Figure 2:
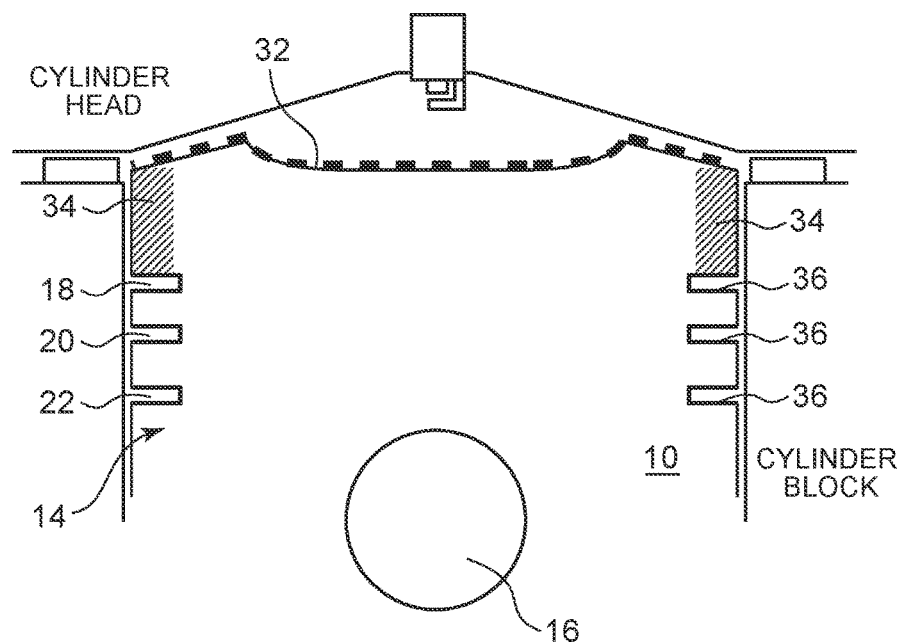
FIG. 2 is a schematic cross-sectional view of the piston of FIG. 1 when the piston is housed inside a cylinder of a spark ignition internal combustion engine.

FIG. 2 is a schematic cross-sectional view, corresponding to the section 2A-2A of FIG. 1, of the piston 10 of FIG. 1 when the piston 10 is housed inside a cylinder of a spark ignition internal combustion engine. In FIG. 2, the piston 10 is located at the top dead point. As shown in FIG. 2, a porous alumite film 32 is formed on the piston top surface. A ceramic film 34 is formed on the side surface of the land part 14 from the groove 18 to the piston top surface, i.e., on the side surface of the top land. A hard alumite film 36 is formed on the surfaces of the grooves 18, 20, 22. On the other hand, the piston base material is exposed in a portion of the side surface of the land part 14 from the groove 18 to the lower surface (not shown) of the land part 14. For example, the piston base material is exposed in the side surface of the land part 14 between the groove 18 and the groove 20, i.e., the side surface of the second land, and in the side surface of the land part 14 between the groove 20 and the groove 22, i.e., the side surface of the third land.

The porous alumite film 32 and the hard alumite film 36 are both formed by anodizing the piston base material (i.e., an aluminum alloy). However, the porous alumite film 32 and the hard alumite film 36 are different from each other in properties and film thickness of the alumite (the film thickness is a thickness in a direction perpendicular to the axial direction of the cylinder; the same applies hereinafter). Specifically, the porous alumite film 32 has a lower thermal conductivity than the piston base material and has a lower heat capacity per unit volume than the piston base material. The film thickness of the porous alumite film 32 is 100 to 500 μm. Excellent in swing characteristics (the followability of the temperature of a film formation surface relative to changes in temperature of a working medium inside a cylinder; the same applies hereinafter), the porous alumite film 32 can achieve various effects (details will be described later).

The porous alumite film 32 may have a film constitution including insulating particles (e.g., particles of silica ($SiO_2$), alumina ($Al_2O_3$), zirconia ($ZrO_2$), or titania ($TiO_2$)). For the constitution and thermal properties (i.e., the thermal conductivity and the heat capacity per unit volume) of the porous alumite film, for example, Japanese Patent Application Publication No. 2010-249008 and Japanese Patent Application Publication No. 2013-14830 can be referred to.

As with the porous alumite film 32, the hard alumite film 36 also has a lower thermal conductivity than the piston base material and has a lower heat capacity per unit volume than the piston base material. However, the hard alumite film 36 is several micrometers thick and has a low porosity, and compared with the porous alumite film 32, the hard alumite film 36 has much higher thermal conductivity and heat capacity per unit volume. Accordingly, the hard alumite film 36 has almost no swing characteristics, but instead is excellent in film hardness and abrasion resistance. The hard alumite film 36 can prevent friction due to contact between the grooves 18, 20, 22 and the piston rings.

The ceramic film 34 is formed by thermal spraying or cold spraying of a ceramic, such as zirconia ($ZrO_2$), silica ($SiO_2$), silicon nitride ($Si_3N_4$), yttria ($Y_2O_3$), or titania ($TiO_2$), or a composite ceramic, such as cermet (TiC.TiN), mullite ($3Al_2O_3.2SiO_2$), cordierite ($2MgO.2Al_2O_3.5SiO_2$), or steatite ($MgO.SiO_2$) (hereinafter referred to simply as a "ceramic-based material"). The ceramic film 34 has a lower thermal conductivity than the piston base material and has a higher heat capacity per unit volume than the porous alumite film 32. The film thickness of the ceramic film 34 is 50 to 3000 μm.

For example, the thermal conductivity $\lambda_{32}$ of the porous alumite film 32 is $\lambda_{32} \leq 0.5$ W/m·K, and the heat capacity per unit volume $C_{32}$ of the porous alumite film 32 is $C_{32} \leq 1500 \times 10^3$ J/m³·K. The thermal conductivity $\lambda_{34}$ of the ceramic film 34 is $\lambda_{34}$<0.5 to 30 W/m·K, and the heat capacity per unit volume $C_{34}$ of the ceramic film 34 is $C_{34}$>$1500 \times 10^3$ J/m³·K. The thermal conductivity $\lambda_{Al}$ of an aluminum alloy is $\lambda_{Al}$=96.2 W/m·K, and the heat capacity $C_{Al}$ is $C_{Al}$=$2639 \times 10^3$ J/m³·K.

The porous alumite film 32 and the ceramic film 34 are different from each other in density and surface roughness Ra of the film (the surface roughness is an arithmetic mean roughness measured in accordance with JISB601 (2001); the same applies hereinafter). Specifically, the porous alumite film 32 has a lower density than the ceramic film 34. The density of the porous alumite film 32 is low because small holes formed in the course of anodizing increase the porosity of the porous alumite film 32. The surface roughness Ra of the porous alumite film 32 is higher than the surface roughness Ra of the ceramic film 34. The surface roughness Ra of the porous alumite film 32 is high because additives in the piston base material hinder the formation of alumite and thereby make the height of the film surface irregular. For example, the surface roughness $Ra_{32}$ of the porous alumite film 32 is 1.0 μm≤$Ra_{32}$≤3.0 μm, and the surface roughness $Ra_{34}$ of the ceramic film 34 is $Ra_{34}$≤1.0 μm

Figure 3:
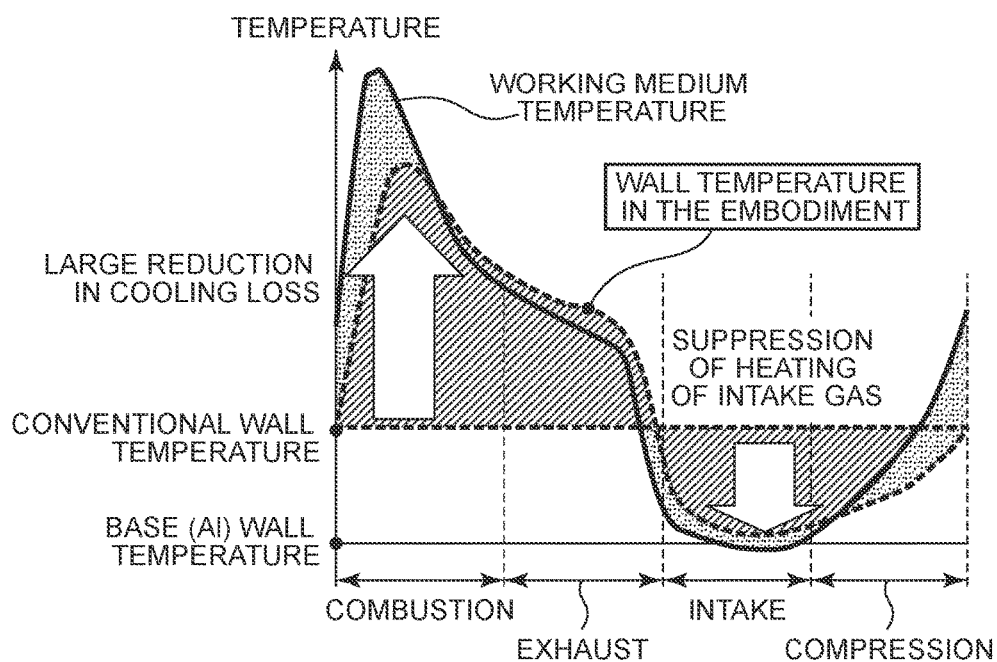
FIG. 3 is a view showing changes in temperature of a working medium inside a cylinder and in temperature of the upper surface of a land part during one cycle of an internal combustion engine.

[Effects of piston] The piston 10 on which the porous alumite film 32 and the ceramic film 34 are formed can achieve the following effects. First, effects of the porous alumite film 32 will be described with reference to FIG. 3. FIG. 3 is a view showing changes in temperature of a working medium inside a cylinder and in temperature of the upper surface of the land part during one cycle of an internal combustion engine. In FIG. 3, "conventional wall temperature" represents the temperature of the upper surface of the land part when a common ceramic film is formed on the upper surface. "Wall temperature in the embodiment" represents the temperature of the upper surface of the land part when a porous alumite film (i.e., the porous alumite film 32) is formed on the upper surface. "Base (Al) wall temperature" represents the temperature of the upper surface of the land part when the piston base material is exposed in the upper surface.

As shown in FIG. 3, when a common ceramic film is formed (conventional wall temperature), the heat-shielding performance at the upper surface of the land part can be improved compared with when the piston base material is exposed (base (Al) wall temperature), so that cooling loss during the combustion stroke can be reduced. However, the temperature of the upper surface of the land part remains high during the intake stroke as well. Accordingly, during the intake stroke, heat migrates from the upper surface of the land part toward the working medium. Thus, the working medium is heated, and knocking or abnormal combustion is likely to occur.

By contrast, when a porous alumite film is formed (wall temperature in the embodiment), the temperature of the upper surface of the land part during the intake stroke can be lowered by virtue of the swing characteristics, and heating of the working medium during the intake stroke can be suppressed (see the downward arrow). Thus, occurrence of knocking or abnormal combustion can be suppressed. Moreover, these swing characteristics can allow the temperature of the upper surface of the land part to increase significantly during the combustion stroke (see the upward arrow). Accordingly, compared with when a common ceramic film is formed, the fuel efficiency can be improved by significantly reducing cooling loss during the combustion stroke.

Next, effects of the ceramic film 34 will be described. Since the density of the ceramic film 34 is higher than the density of the porous alumite film 32, breakage of the film during upward and downward motion of the piston 10 can be suppressed compared with when a porous alumite film similar to the porous alumite film 32 is formed on the side surface of the top land. In addition, since the surface roughness Ra of the ceramic film 34 is lower than the surface roughness Ra of the porous alumite film 32, friction occurring between the piston 10 and the cylinder can also be reduced compared with when a porous alumite film similar to the porous alumite film 32 is formed on the side surface of the top land.

Figure 4:
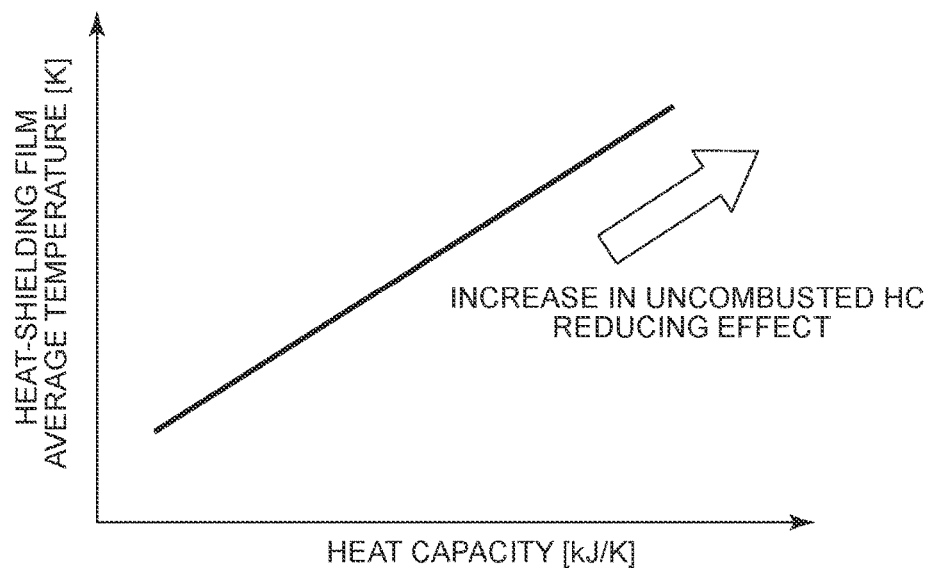
FIG. 4 is a view showing a relation among an average temperature of a ceramic film during one cycle of an internal combustion engine, the heat capacity per unit volume of the ceramic film, and an uncombusted HC reducing effect.

Since the ceramic film 34 has a lower thermal conductivity than the piston base material and has a higher heat capacity per unit volume than the porous alumite film 32, the average temperature of the film during one cycle of the internal combustion engine can be increased. FIG. 4 is a view showing a relation among the average temperature of the ceramic film during one cycle of the internal combustion engine, the heat capacity per unit volume of the ceramic film, and an uncombusted HC reducing effect. As with the thermal conductivity of the ceramic film 34, the thermal conductivity of the ceramic film in FIG. 4 is lower than that of the piston base material. As shown in FIG. 4, if the heat capacity per unit volume of the ceramic film is increased, the average temperature of the ceramic film during one cycle can be increased. This is because the heat-retaining effect of the ceramic film, which has a lower thermal conductivity than the piston base material, increases as the heat capacity per unit volume of the ceramic film increases.

If the average temperature of the ceramic film during one cycle can be increased, the following effects can be expected. That is, when the porous alumite film 32 is formed on the upper surface of the land part, the temperature of the upper surface can be increased during the combustion stroke (see FIG. 3). However, the downside is that the viscosity of the working medium increases as the temperature of the upper surface increases, so that the fluidity of the working medium decreases and deterioration of combustion is likely to occur. As described above, once deterioration of combustion occurs, the working medium present around the side surface of the top land, unable to combust during the combustion stroke, remains around the side surface. Moreover, the working medium remaining around the side surface of the top land is cooled, so that the fuel inside the working medium is condensed and adheres to the side surface.

In this regard, if the average temperature of the ceramic film during one cycle can be increased, even if, in a certain cycle, the working medium present around the ceramic film remains without combusting during the combustion stroke and is carried over to the intake stroke, the working medium can be combusted thereafter in the combustion stroke. Thus, fuel adhesion to the side surface of the top land can be suppressed. In other words, the uncombusted HC reducing effect can be enhanced (see FIG. 4).

Figure 5:
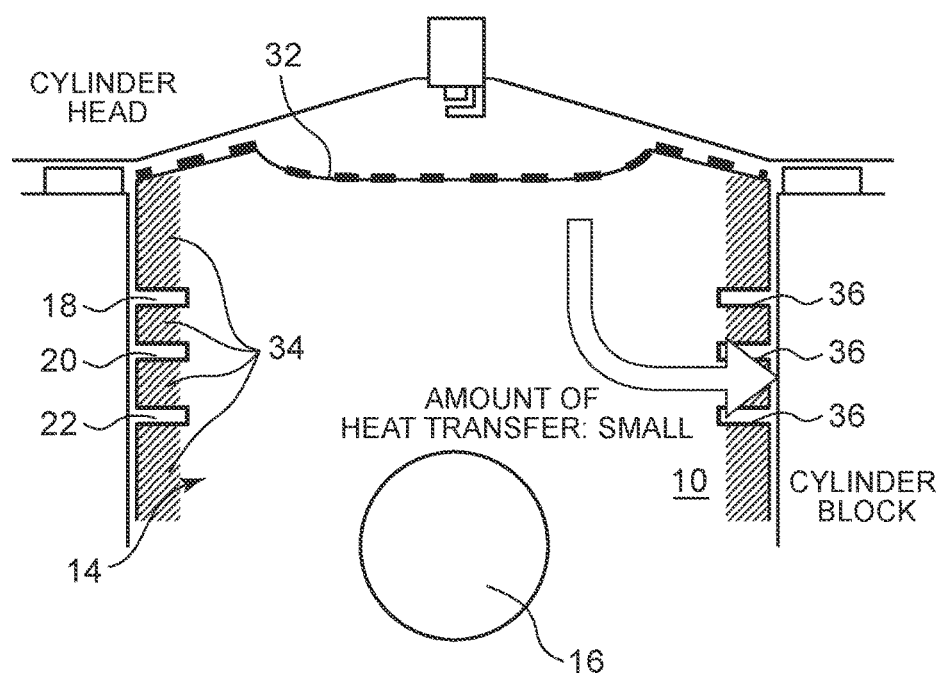
FIG. 5 is a view showing the amount of heat transfer from the upper surface of the land part to the side surface of the piston.
Figure 6:
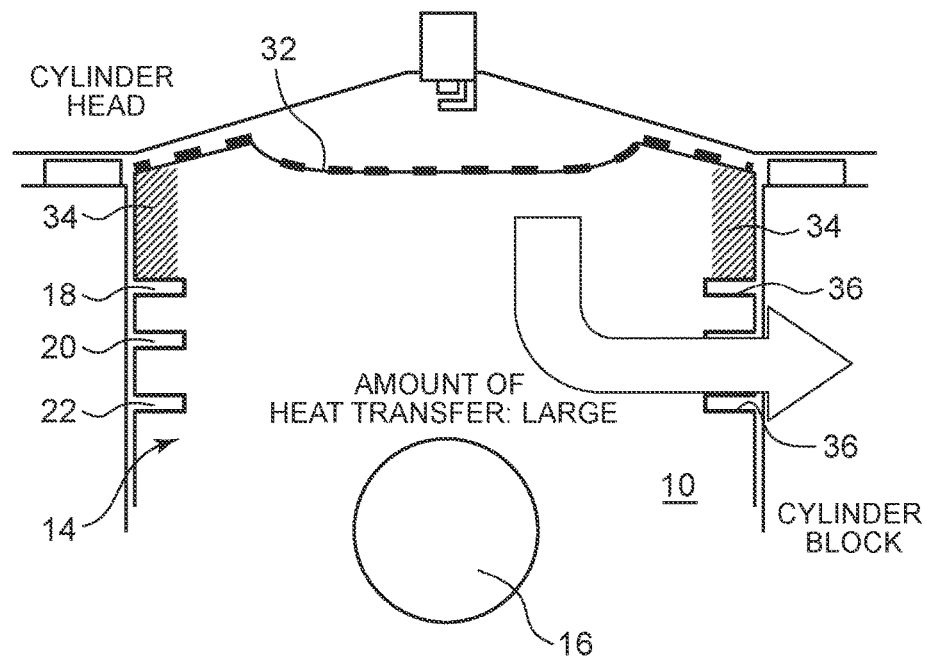
FIG. 6 is a view showing the amount of heat transfer from the upper surface of the land part to the side surface of the piston.

Here, in connection with the effects of the ceramic film 34, the reason why the ceramic film 34 is formed only on the side surface of the top land will be described with reference to FIG. 5 and FIG. 6. FIG. 5 and FIG. 6 are views showing the amount of heat transfer from the upper surface of the land part to the side surface of the piston. In view of the above-described uncombusted HC reducing effect, forming the ceramic film 34 not only on the side surface of the top land but also on the side surfaces of the second land and the third land is a conceivable option. However, a major contributor to the decrease in temperature of the upper surface of the land part during the intake stroke described with FIG. 3 is heat transfer from the side surface of the piston to the inner wall surface of the cylinder during the period from the latter half of the preceding exhaust stroke to the first half of the intake stroke. Therefore, if a ceramic film similar to the ceramic film 34 is formed on the side surfaces of the second land and the third land, the amount of heat transfer from the side surface to the inner wall surface decreases (see the arrow in FIG. 5). Then, the working medium suctioned into the cylinder is warmed by heat that is remaining on the top surface of the piston after the middle of the intake stroke, so that knocking or abnormal combustion occurs.

In this regard, it is possible to increase the amount of heat transfer from the side surface of the piston to the inner wall surface of the cylinder via the piston rings fitted in the grooves 18, 20, 22 (see the arrow in FIG. 6) by forming the ceramic film 34 on the side surface of the top land while forming no ceramic film 34 on the side surfaces of the second land and the third land so as to expose the piston base material. Accordingly, heating of the working medium during the intake stroke can be suppressed. Thus, it is possible to suppress heating of the working medium during the intake stroke while enhancing the uncombusted HC reducing effect by forming the ceramic film 34 on the side surface of the top land and exposing the piston base material in the side surfaces of the second land and the third land.

In the above embodiment, the porous alumite film 32 and the ceramic film 34 correspond to the "heat-shielding film" and the "first heat-retaining film", respectively, of the first aspect. If the porous alumite film 32 includes porous particles, the porous alumite film 32 including porous particles corresponds to the "heat-shielding film" of the first aspect. It goes without saying that the "heat-shielding film" of the first aspect is not limited to the aspect described in the embodiment. For example, zirconia ($ZrO_2$), silica ($SiO_2$), silicon nitride ($Si_3N_4$), yttria ($Y_2O_3$), titanium oxide ($TiO_2$), etc. may be used as a material composing the heat-shielding film. The heat-shielding film may be formed by various means including thermal spraying.

Figure 7:
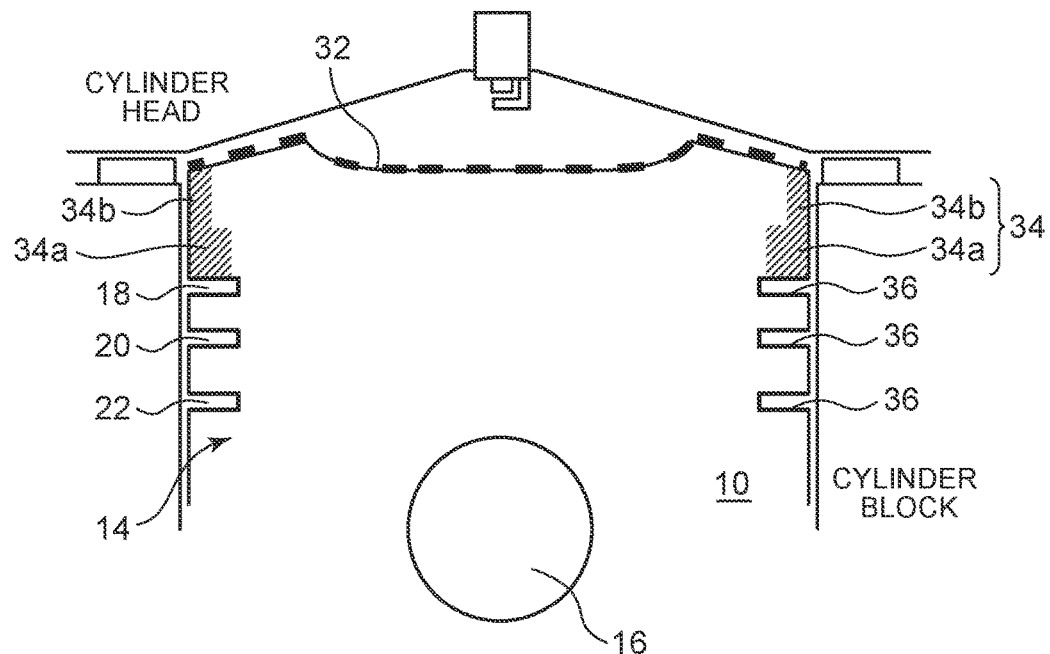
FIG. 7 is a view illustrating a modified example of the piston according to the embodiment of the present invention.
Figure 8:
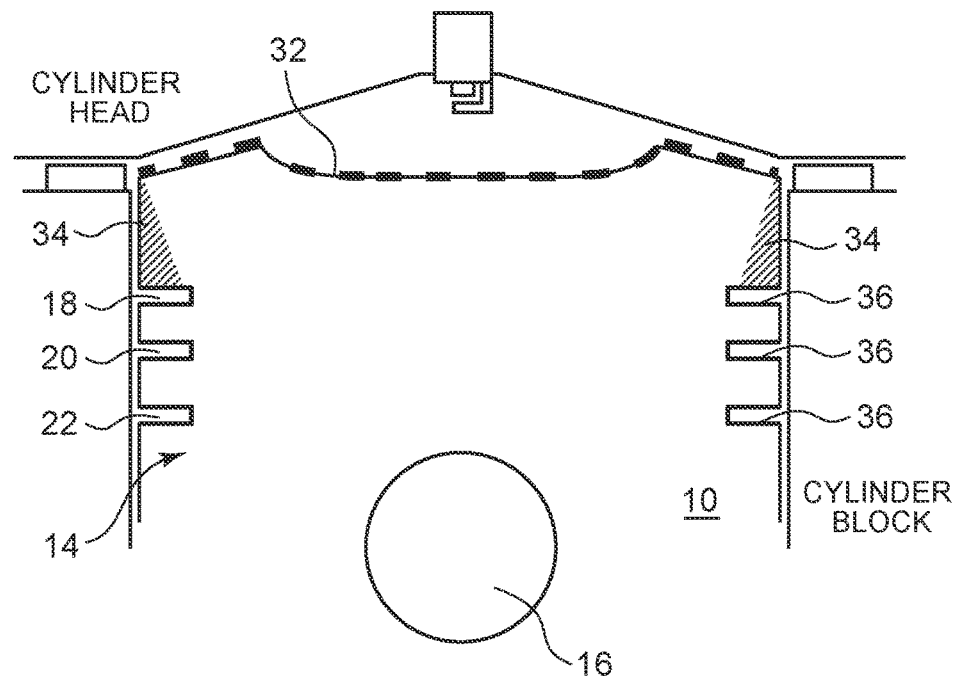
FIG. 8 is a view illustrating a modified example of the piston according to the embodiment of the present invention.
Figure 9:
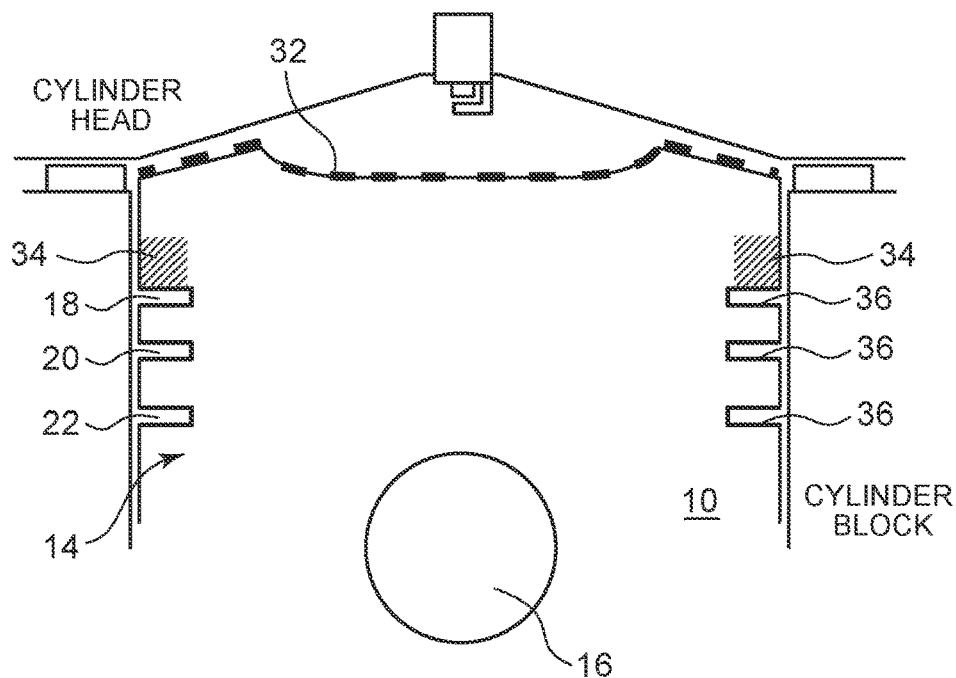
FIG. 9 is a view illustrating a modified example of the piston according to the embodiment of the present invention.

[Modified examples of piston] In the above embodiment, the ceramic film 34 having a constant film thickness is formed on the entire side surface of the top land. However, the film thickness of the ceramic film 34 may be varied in stages or continuously, and the ceramic film 34 may be formed on a part of the side surface of the top land. FIG. 7 to FIG. 9 are views illustrating modified examples of the piston according to the embodiment of the present invention. As with FIG. 2, FIG. 7 to FIG. 9 are schematic cross-sectional views of a cylinder of a spark ignition internal combustion engine.

In the example of FIG. 7, the film thickness of the ceramic film 34 is varied in two stages. Specifically, the film thickness of a ceramic film 34b on the side of the piston top surface is smaller than the film thickness (50 to 3000 µm) of a ceramic film 34a on the side of the groove 18. In the example of FIG. 8, the film thickness on the side of the groove 18 is largest (50 to 3000 µm), and the film thickness is reduced from the groove 18 toward the piston top surface. In the example of FIG. 9, although the film thickness of the ceramic film 34 is constant (50 to 3000 µm), the ceramic film 34 is formed from the middle of the top land to the groove 18, while the piston base material is exposed from the middle of the top land to the piston top surface.

To look at the side surface of the top land, the temperature of the side surface decreases with the increasing distance from the piston top surface. Accordingly, if the working medium present around the side surface of the top land remains without combusting during the combustion stroke and is carried over to the intake stroke, there is a high probability that the fuel inside the residual working medium is condensed in a region closer to the side surface. In this regard, as shown in FIG. 7 to FIG. 9, forming the ceramic film 34 in a region of the side surface of the top land closer to the groove 18 can enhance the heat-retaining effect in that region. Thus, condensation of the fuel inside the residual working medium can be favorably suppressed.

Figure 10:
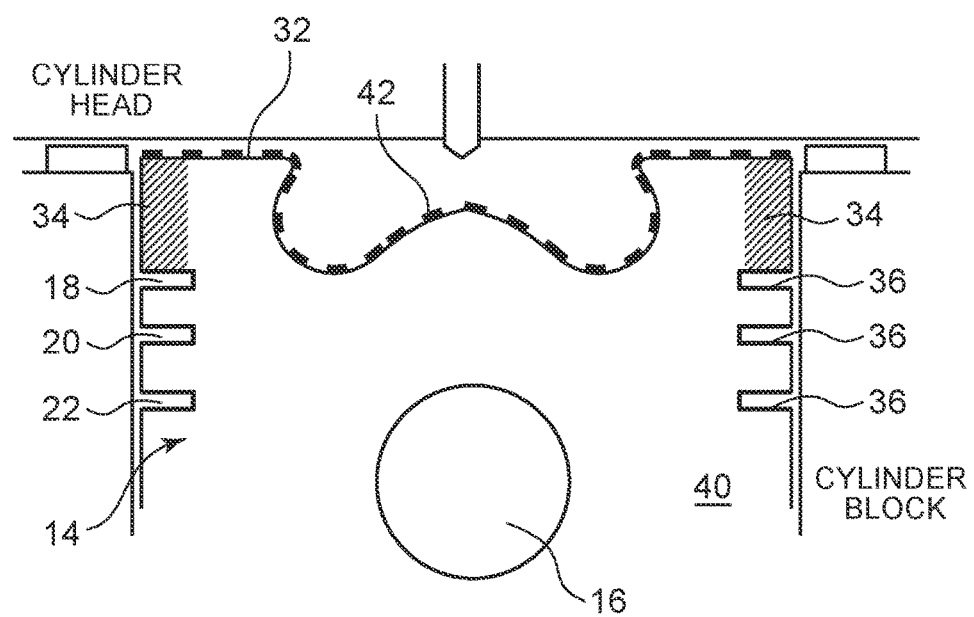
FIG. 10 is a schematic cross-sectional view of a piston, on which a porous alumite film, a ceramic film, and a hard alumite film are formed, when the piston is housed inside a cylinder of a compression ignition internal combustion engine.

In the description of the above embodiment, the piston 10 is applied to a spark ignition internal combustion engine. However, a piston on which three types of films (i.e., the porous alumite film 32, the ceramic film 34, and the hard alumite film 36; the same applies hereinafter) are formed may be applied to a compression ignition internal combustion engine. FIG. 10 is a schematic cross-sectional view of a piston, on which the three types of films are formed, when the piston is housed inside a cylinder of a compression ignition internal combustion engine. In FIG. 10, a piston 40 is located at the top dead point. The piston 40 shown in FIG. 10 and the piston 10 are different from each other in that a cavity 42 is formed in the piston 40 at the center of the upper surface of the land part 14, but basically the two pistons are otherwise the same with each other. Accordingly, the piston 40 can achieve the same effects as the piston 10.

[Internal combustion engine] Next, an embodiment of an internal combustion engine of the present invention will be described with reference to FIG. 11. The internal combustion engine according to this embodiment corresponds to a spark ignition internal combustion engine with the above-described piston 10 integrated therein. Therefore, description of the piston 10 and the three types of films will be omitted.

Figure 11:
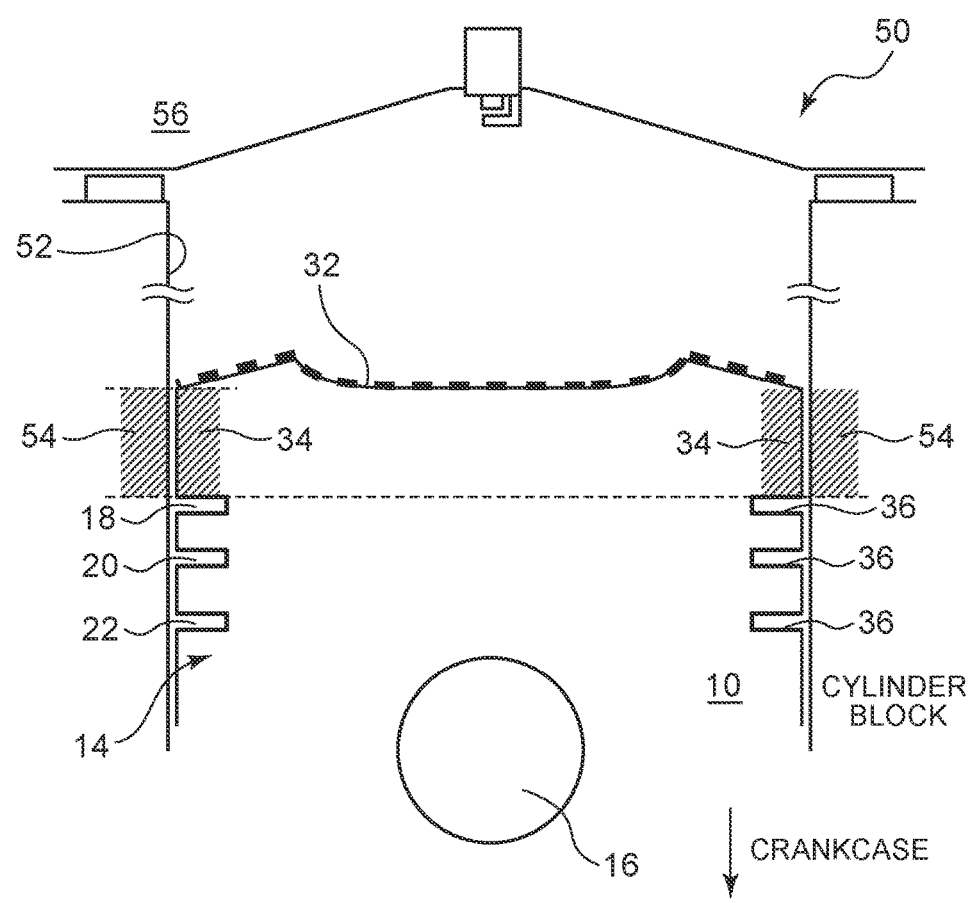
FIG. 11 is a schematic cross-sectional view of an internal combustion engine according to an embodiment of the present invention.

FIG. 11 is a schematic cross-sectional view of an internal combustion engine 50 according to the embodiment of the present invention. In FIG. 11, the piston 10 is located at the bottom dead point. As shown in FIG. 11, a ceramic film 54 is formed on the inner wall surface of a cylinder 52 of the internal combustion engine 50. The piston base material is exposed in a region of this inner wall surface other than the formation region of the ceramic film 54.

The thermal properties etc. of the ceramic film 54 are basically the same as those of the ceramic film 34. That is, the ceramic film 54 is formed by thermal spraying or cold spraying of a ceramic-based material. The ceramic film 54 has a lower thermal conductivity than the piston base material and has a higher heat capacity per unit volume than the porous alumite film 32. The film thickness of the ceramic film 54 is 50 to 3000 µm. The film width (the film thickness in a direction parallel to the axial direction of the cylinder; the same applies hereinafter) of the ceramic film 54 is the same as the film width of the ceramic film 34.

As shown in FIG. 11, the ceramic film 54 is formed at such a position that the ceramic film 54 faces the side surface of the top land (i.e., the surface where the ceramic film 34 is formed) when the piston 10 is located at the bottom dead point. Basically, the temperature of the inner wall surface of the cylinder 52 decreases with the decreasing distance to the crankcase. Accordingly, the temperature of the ceramic film 34 can be considered to be lowest at the bottom dead point where the distance to the crankcase is minimum. In this regard, if the ceramic film 54 is formed as shown in FIG. 11, at the position where the temperature of the ceramic film 34 is lowest, the working medium present around the side surface of the top land can be warmed by the ceramic film 54 formed on the inner wall surface of the cylinder 52. Thus, fuel adhesion to the side surface of the top land can be suppressed.

In the above embodiment, the ceramic film 54 corresponds to the "second heat-retaining film" of the fourth aspect.

[Manufacturing method of piston] Next, a manufacturing method of the piston according to an embodiment of the present invention will be described with reference to FIG. 12. The manufacturing method according to this embodiment corresponds to a method for manufacturing the above-described piston 10.

Figure 12:
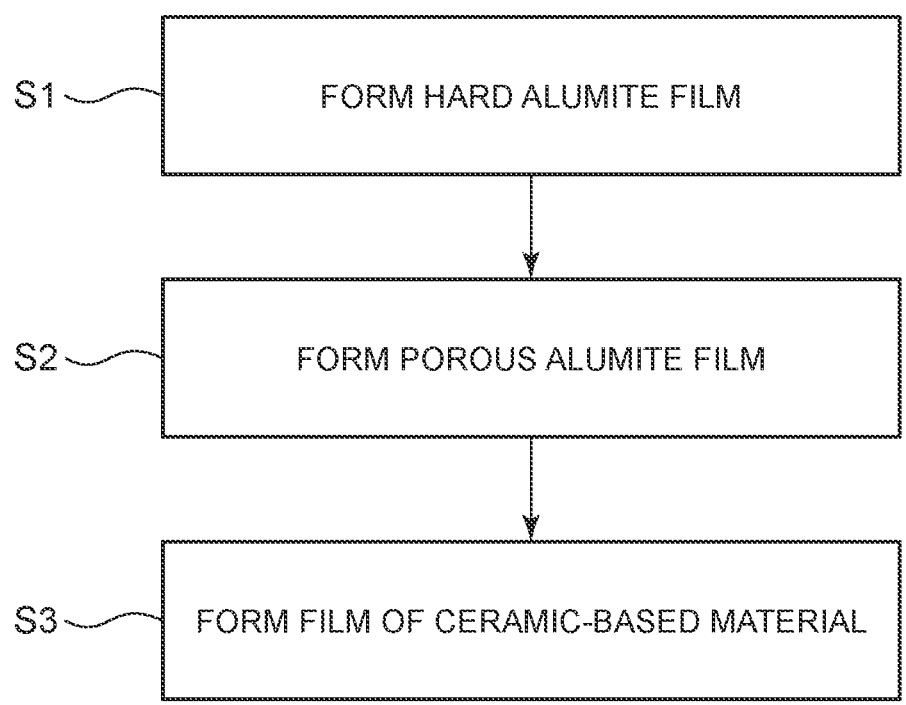
FIG. 12 is a flowchart illustrating a manufacturing method of the piston according to an embodiment of the present invention.

FIG. 12 is a flowchart illustrating the manufacturing method of the piston according to the embodiment of the present invention. As shown in FIG. 12, in this embodiment, first, a hard alumite film is formed on the surfaces of the grooves 18, 20, 22 by anodizing (step S1). In this step S1, specifically, in the surface of the land part of the piston where the grooves 18, 20, 22, the valve recesses 24, 26, 28, 30, etc. are formed, regions where formation of a hard alumite film is not required are masked. Subsequently, this piston is installed in an electrolytic device including an electrolytic cell, a cathode, and a power source. Then, electrolysis conditions (i.e., the temperature of an electrolyte solution, the electric current density, and the time of electrolysis; the same applies hereinafter) that are suitable for the formation of a hard alumite film are set, and electric power is applied between the piston, which serves as the anode, and the cathode. As a result of this step S1, the hard alumite film 36 is formed.

Following step S1, a porous alumite film is formed on the upper surface of the land part by anodizing (step S2). This step S2 is basically the same as step S1. That is, in step S2, regions of the surface of the land part where formation of a porous alumite film is not required are masked. Subsequently, this piston is installed in the electrolytic device in an inverted state and electrolysis is performed. Specifically, electrolysis conditions that are suitable for the formation of a porous alumite film are set, and electric power is applied between the piston, which serves as the anode, and the cathode. Thus, a porous alumite film is formed. After film formation, the surface of the film formed is polished as necessary. In the case where the above-mentioned insulating particles are used along with porous alumite, after formation of the porous alumite film, a solution including these insulating particles (e.g., polysilazane solution or polysiloxane solution) is applied to the surface of the porous alumite. As a result of this step S2, the porous alumite film 32 is formed.

Following step S2, a film of a ceramic-based material is formed on the side surface of the top land (step S3). In this step S3, first, the side surface of the top land is cut by the film thickness of the ceramic-based material. The purpose of this cutting is to prevent the clearance between the side surface of the top land and the inner wall surface of the cylinder from being reduced by the formation of the film of the ceramic-based material. Subsequently, the cut surface is blasted. The purpose of this blasting is to intentionally increase the surface roughness of the cut surface and thereby improve the adhesion of the ceramic film, which is to be formed on this cut surface, to the piston base material by virtue of an anchor effect. Subsequently, thermal spraying or cold spraying of the ceramic-based material to the blasted surface is performed. Thus, a film of the ceramic-based material is formed. After film formation, the surface of the film formed is polished as necessary. As a result of this step S3, the ceramic film 34 is formed.

Since the ceramic-based material basically exhibits an insulating property, if step S1 or step S2 is performed after step S3, the anodization reaction is inhibited. In this regard, according to this embodiment, step S1 and step S2 are performed before step S3, so that variation in structure and film thickness of the three types of films can be suppressed.

In the above embodiment, step S2 and step S3 correspond to the "heat-shielding film" forming step and the "heat-retaining film" forming step, respectively, of the fifth aspect of the present invention.

[Modified example of manufacturing method] In the above embodiment, step S2 is performed after step S1. However, step S2 may be performed before step S1. In the above embodiment, a film of a ceramic-based material is formed by thermal spraying or cold spraying in step S3. However, a ring-shaped molded body may be separately produced from a ceramic-based material and this molded body may be press-fitted onto the side surface of the top land.

What is claimed is:

1. A piston for an internal combustion engine, the piston comprising:
   a heat-shielding film provided to an upper surface of a land part of the piston, the heat-shielding film having a lower thermal conductivity than a piston base material and having a lower heat capacity per unit volume than the piston base material; and
   a first heat-retaining film provided to a side surface of the land part, the first heat-retaining film having a lower thermal conductivity than the piston base material and having a higher heat capacity per unit volume than the heat-shielding film,
   wherein the heat-shielding film is an anodized film,
   wherein the heat-shielding firm is not provided to the side surface of the land part,
   wherein the first heat-retaining film is provided to a part of a side surface of a top land, and the top land is a portion of the land part further on the upper side than a groove in which a top ring is fitted, and
   wherein a surface roughness of the first heat-retaining film is lower than a surface roughness of the heat-shielding film.

2. The piston according to claim 1, wherein
   the side surface of the top land located on the side of the upper surface of the land part has a higher heat-retaining effect than the side surface of the top land located on the side of a lower surface of the land part.

3. The piston according to claim 1, wherein
   the piston base material is exposed in a portion of the side surface of the land part further on the lower side than the groove.

4. The piston according to claim 1, wherein the first heat-retaining film is a hard alumite having a lower porosity than the heat-shielding film resulting in the higher heat capacity per unit volume than the heat-shielding film.

5. A piston for an internal combustion engine, the piston comprising:
   a heat-shielding film provided to an upper surface of a land part of the piston, the heat-shielding film having a lower thermal conductivity than a piston base material and having a lower heat capacity per unit volume than the piston base material; and
   a first heat-retaining film provided to a side surface of the land part, the first heat-retaining film having a lower thermal conductivity than the piston base material and having a higher heat capacity per unit volume than the heat-shielding film,
   wherein
   a second heat-retaining film is provided to an inner wall surface of a cylinder that houses the piston,
   the second heat-retaining film is provided at such a position that the second heat-retaining film faces the side surface of the land part when the piston is located at a bottom dead point, and
   the second heat-retaining film has a heat capacity per unit volume lower than that of the piston base material and higher than that of the heat-shielding film.

6. A manufacturing method of a piston for an internal combustion engine, the piston including:
   a heat-shielding film provided to an upper surface of a land part of the piston, the heat-shielding film having a lower thermal conductivity than a piston base material and having a lower heat capacity per unit volume than the piston base material; and
   a first heat-retaining film provided to a side surface of the land part, the first heat-retaining film having a lower thermal conductivity than the piston base material and having a higher heat capacity per unit volume than the heat-shielding film, the manufacturing method comprising:
   forming the heat-shielding film on the upper surface of the land part by anodizing the piston base material; and
   after forming the heat-shielding film, forming the first heat-retaining film on the side surface of the land part by forming a film of an insulating material, the insulating material having a lower thermal conductivity than the piston base material and having a higher heat capacity per unit volume than the heat-shielding film.

* * * * *